United States Patent
Garg

(10) Patent No.: US 7,089,275 B2
(45) Date of Patent: Aug. 8, 2006

(54) BLOCK-PARTITIONED TECHNIQUE FOR SOLVING A SYSTEM OF LINEAR EQUATIONS REPRESENTED BY A MATRIX WITH STATIC AND DYNAMIC ENTRIES

(75) Inventor: Rajat P. Garg, San Jose, CA (US)

(73) Assignee: SUN Microsystems, Inc., Santa Clara, CA (US)

( * ) Notice: Subject to any disclaimer, the term of this patent is extended or adjusted under 35 U.S.C. 154(b) by 700 days.

(21) Appl. No.: 10/354,330

(22) Filed: Jan. 29, 2003

(65) Prior Publication Data

US 2004/0148324 A1    Jul. 29, 2004

(51) Int. Cl.
*G06F 7/38* (2006.01)
*G06F 17/50* (2006.01)

(52) U.S. Cl. ......................... 708/446; 703/14
(58) Field of Classification Search ............... 708/446; 703/13, 14, 15
See application file for complete search history.

(56) References Cited

U.S. PATENT DOCUMENTS

| 5,206,822 | A | * | 4/1993 | Taylor ...................... 708/607 |
| 5,392,429 | A | * | 2/1995 | Agrawal et al. ............ 708/446 |
| 5,655,137 | A | * | 8/1997 | Kevorkian ................... 712/17 |
| 6,088,523 | A | * | 7/2000 | Nabors et al. ............... 703/14 |
| 6,694,343 | B1 | * | 2/2004 | Forrest et al. .............. 708/520 |

* cited by examiner

*Primary Examiner*—Chuong D. Ngo
(74) *Attorney, Agent, or Firm*—Park, Vaughan & Fleming LLP

(57) ABSTRACT

One embodiment of the present invention provides a system that uses a block-partitioned technique to efficiently solve a system of linear equations. The system first receives a matrix that specifies the system of linear equations to be used in performing a time-based simulation. This matrix includes a static portion containing entries that remain fixed over multiple time steps in the time-based simulation, as well as a dynamic portion containing entries that change between time steps in the time-based simulation. Next, the system performs the time-based simulation, wherein performing the time-based simulation involves solving the system of linear equations for each time step in the time-based simulation. In solving the system of linear equations, the system factorizes the static portion of the matrix only once, and reuses the factorization of the static portion in performing an overall factorization of the matrix for each time step of the time-based simulation.

27 Claims, 3 Drawing Sheets

BLOCK-PARTITIONED TECHNIQUE FOR SOLVING A SYSTEM OF LINEAR EQUATIONS REPRESENTED BY A MATRIX WITH STATIC AND DYNAMIC ENTRIES

BACKGROUND

1. Field of the Invention

The present invention relates to computer systems for performing sparse matrix computations. More particularly, the present invention relates to a method and an apparatus that uses a block-partitioned technique to efficiently solve sparse systems of linear equations.

2. Related Art

The solution of large sparse symmetric linear systems of equations constitutes the primary computational cost in numerous applications, such as finite-element design, linear programming, circuit simulation and semiconductor device modeling. Efficient solution of such systems has long been the subject of research, and considerable progress has been made in developing efficient algorithms to this end. A direct solution technique known as "Cholesky Factorization" is the most widely used approach to solve such a system. Under Cholesky factorization, the complete solution sequence requires many stages, including matrix reordering, symbolic factorization, numerical factorization and triangular solution. Of these stages, numerical factorization is typically the most computationally expensive.

One method of performing numerical factorization is based on a right-looking supernode-supernode method described in "Parallel Algorithms for Sparse Linear Systems" by Michael T. Heath, Esmond Ng and Barry W. Peyton, in "Parallel Algorithms for Matrix Computations" by Gallivan, et al. (Editors), SIAM (1994) (referred to as HNP). In a sparse matrix, a supernode is a set of contiguous columns that have essentially the same sparsity structure. Supernodes can be used to organize the numerical factorization stage around matrix-vector (supernode-column) and matrix-matrix (supernode-supernode) primitive operations leading to a substantial performance improvement arising from more efficient use of the processor caches and pipelining units.

In some applications, for example circuit simulation, existing numerical factorization techniques perform unnecessary work because the matrix system arising in such simulations is only partially modified from one time step to the next in a time-dependent simulation. For example, in a circuit simulation, linear circuit elements, such as resistors and capacitors, do not change from one time step to the next. In contrast, non-linear components, such as diodes, exhibit a nonlinear relationship between current and voltage and are typically time-dependent. Hence, the matrix system for simulating the circuit includes some static entries that remain fixed over many time steps, and some dynamic entries that change from one time step to the next. This means that the much of the work involved in factorizing the static entries every time step is largely wasted because the static entries do not change between time steps.

Hence, what is needed is a method and an apparatus for solving systems of linear equations without performing unnecessary work in factorizing static matrix entries.

SUMMARY

One embodiment of the present invention provides a system that uses a block-partitioned technique to efficiently solve a system of linear equations. The system first receives a matrix that specifies the system of linear equations to be used in performing a time-based simulation. This matrix includes a static portion containing entries that remain fixed over multiple time steps in the time-based simulation, as well as a dynamic portion containing entries that change between time steps in the time-based simulation. Next, the system performs the time-based simulation, wherein performing the time-based simulation involves solving the system of linear equations for each time step in the time-based simulation. In solving the system of linear equations, the system factorizes the static portion of the matrix only once, and reuses the factorization of the static portion in performing an overall factorization of the matrix for each time step of the time-based simulation.

In a variation on this embodiment, prior to receiving the matrix, the system generates the matrix from the system of linear equations, and in doing so organizes the matrix into disjoint static and dynamic portions.

In a variation on this embodiment, wherein the static portion is located within an upper-diagonal block of the matrix, and the dynamic portion includes a lower-diagonal block of the matrix, as well as off-diagonal blocks located between the upper-diagonal block and the lower-diagonal block.

In a variation on this embodiment, the time-based simulation involves a simulation of a circuit. This circuit includes linear elements, which do not change between time steps in the time-based simulation, as well as non-linear elements, which change between time steps in the time-based simulation. In this variation, the upper-diagonal block of the matrix represents connections between static elements of the circuit, and the lower-diagonal block of the matrix represents connections between dynamic elements of the circuit. Similarly, the off-diagonal blocks of the matrix represent connections between dynamic and static elements of the circuit.

In a variation on this embodiment, the system of linear equations is a sparse system of linear equations and the matrix is a sparse matrix.

In a variation on this embodiment, solving the system of linear equations involves using sparse matrix techniques on the static portion of the matrix and using dense matrix techniques on the dynamic portion of the matrix.

In a variation on this embodiment, solving the system of linear equations involves using sparse matrix techniques on both the static and dynamic portions of the matrix.

In a further variation, the sparse matrix, and other data structures used in solving the sparse system of linear equations, are represented in Harwell-Boeing format.

In a variation on this embodiment, solving the system of linear equations involves using a technique based on Cholesky factorization to solve the system of linear equations.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
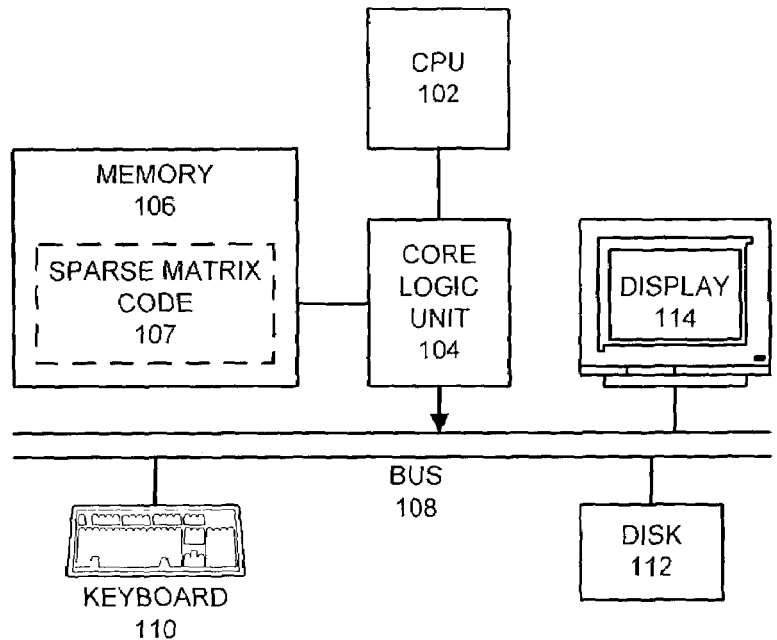
FIG. 1 illustrates a computer system in accordance with an embodiment of the present invention.

FIG. 1 illustrates a computer system in accordance with an embodiment of the present invention. The computer system illustrated in FIG. 1 includes central processing unit (CPU) 102, core logic unit 104, memory 106, bus 108, display 114, keyboard 110 and disk 112.

Core logic unit 104 couples CPU 102 with memory 106. CPU 102 may include any type of computational engine for executing programs within the computer system. This includes, but is not limited to, a microprocessor, a device controller and a computational device within an appliance. Memory 106 may include any type of random access memory for storing code and data for use by CPU 102. As illustrated in FIG. 1, memory 106 includes sparse matrix code 107 for solving systems of linear equations involving sparse matrices. Core logic unit 104 includes circuitry for interconnecting various computer system components, including CPU 102, memory 106 and bus 108.

Bus 108 couples core logic unit 104 with display 114, keyboard 110 and disk 112. Bus 108 may include any type of communication channel for coupling core logic unit 104 with peripheral devices, such as display 114, keyboard 110 and disk 112. Display 114 may include any type of device for displaying images from a computer system. Disk 112 may include any type of non-volatile storage device for storing code and data to for use by CPU 102. This includes, but is not limited to, magnetic storage devices, such as a disk drive, and electronic storage devices, such as flash memory or battery backed up RAM. Keyboard 110 may include any type of device for inputting data into the computing system. This includes input devices such as a keyboard and a mouse.

Note that although a specific computer system architecture is illustrated in FIG. 1, the present invention may be used with any computational device that can execute a computer program.

Cholesky Factorization

Figure 2:
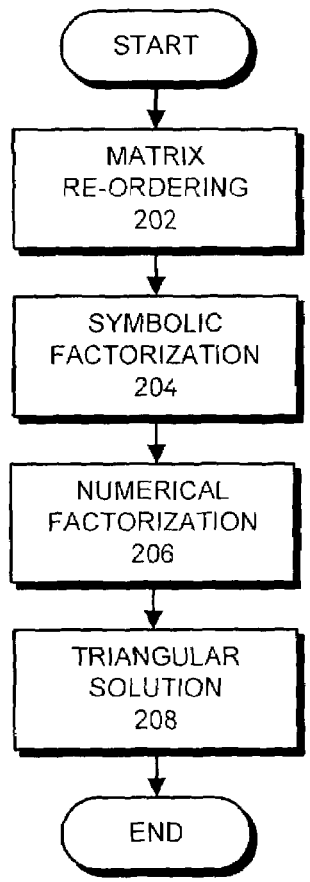
FIG. 2 illustrates the operations involved solving a sparse symmetric system of linear equations in accordance with an embodiment of the present invention.

FIG. 2 illustrates the major stages involved solving a sparse symmetric linear systems of equations in accordance with an embodiment of the present invention. The system starts with an equation of the form Ax=b, where A is an n×n sparse matrix that is both symmetric and positive-definite, b is a known vector and x is the unknown solution vector to be computed.

One way to solve the linear system is to first compute the Cholesky factorization $A=LL^T$, where the Cholesky factor L is a lower triangular matrix with positive definite diagonal elements. Then the solution vector x can be computed by successive forward and back substitutions to solve the triangular systems Ly=b and $L^Tx=y$" (see page 84 of HNP above).

As mentioned above, the Cholesky factorization approach involves a number of operations, including prefactorzation operations, such as matrix reordering (step 202), symbolic factorization (step 204), as well as numerical factorization (step 206) and triangular solution (step 208). The matrix reordering step 202 involves shuffling around the rows and columns of the sparse matrix so that "fill in" gets reduced. During numerical factorization, "fill in" increases the number of non-zero elements in the sparse matrix and hence reduces computational performance.

The symbolic factorization step 204 determines which entries will become non-zero values and also identifies supernodes. As mentioned above, a supernode is a set of contiguous columns that have essentially the same sparsity structure. Supernodes can be used to organize the numerical factorization stage around matrix-vector (supernode-column) and matrix-matrix (supernode-supernode) primitive operations leading to a substantial performance improvement arising from more efficient use of the caches and pipelining units. The symbolic factorization step 204 also involves allocating memory needed to solve the sparse matrix.

Next, the numerical factorization step 206 is performed using Gaussian elimination (or some equivalent solution technique) on the sparse matrix. Note that this generally requires $O(n^3)$ time for an n×n dense matrix.

Finally, the triangular solution step 208 solves the remaining triangular system of equations.

Of the four above-listed operations, the numerical factorization (step 206) consumes most of the computational time.

Solver

The solver according to one embodiment of the present invention is based on a right-looking supernode-supernode method (see HNP). In a sparse matrix, "supernodes" are a set of contiguous columns that have essentially the same sparsity structure and are key to computational efficiency in the factorization step. The columns in a supernode can be treated as a unit for both computation and storage. These supernodes can be used to organize the whole factorization stage around matrix-vector (supernode-column) and matrix-matrix (supernode-supernode) like primitives leading to a substantial performance improvement (due to more efficient use of the processor caches and pipelining units).

In one embodiment of the present invention, we use this solver as an underlying tool and use a block-partitioned factorization framework on top of it to handle partially modified matrix systems.

The technique developed to solve the above-mentioned problem comprises several steps. In what follows, we will first outline the underlying mathematical treatment and then cover implementation-specific details.

The Problem

Recall the problem being solved is solution of a sparse linear system of equations $Ax=b$, where $A$ is an $n \times n$ sparse symmetric positive-definite matrix. We can decompose $A$ into a block representation as follows, $$A = \begin{bmatrix} A_{11} & A_{12} \\ A_{21} & A_{22} \end{bmatrix}$$

where $A_{11}$ represents the static portion of the matrix and represents the inter-connections between the static elements of the circuit.

$A_{12}$, $A_{21}$ and $A_{22}$ collectively represent the dynamic portion of the matrix. The off-diagonal dynamic blocks, $A_{12}$, $A_{21}$, represent the connections between the time-dependent and static elements of the circuit. The diagonal-dynamic block, $A_{22}$, represents the inter-connections between the time-dependent elements in the circuit (also see FIG. 4).

Note that the exact zero/non-zero structure of $A$ depends on the circuit topology and will be different for different circuits. Also note that since $A$ is symmetric and positive definite, it can be shown that $A_{11}$ and $A_{22}$ are also symmetric and positive definite. Furthermore, note that since $A$ is symmetric, $A_{21} = A_{12}^T$ where the superscript "T" represents "transpose." Let $A_{11}$: $N_1 \times N_1$
$A_{22}$: $N_2 \times N_2$
$A_{21}$: $N_2 \times N_1$
$A_{12}$: $N_1 \times N_2$ wherein $N_1 + N_2 = N$, and wherein $bf = N_1/N$ ($0 \leq bf \leq 1$) is called the "block divider."

We now describe a block-partitioning technique that allows us to factorize $A_{11}$ once and use the resulting factorization to update the factorization of the $A_{12}$, $A_{21}$ and $A_{22}$ blocks.

Let $P$ be a permutation matrix (determined so as to minimize the fill-in during factorization of $A_{11}$). $P$ is represented as, $$P = \begin{bmatrix} P_1 & 0 \\ 0 & I \end{bmatrix}$$

wherein $P_1$ is an $N_1 \times N_1$ matrix representing permutation for fill reduction in factorization of $A_{11}$, and $I$ is an $N_2 \times N_2$ identity matrix. Note that $P$ is a unitary matrix: $P^{-1} = P^T$ (P-inverse = P-transpose).

The overall sequence in the $Ax = b$ solution comprises (see HNP)

$A' = P*A*P^T$ (fill-reducing permutation of $A$);
$A' = L*D*L^T$ (factorization of $A'$);
$L*y = P*b$ (forward elimination);
$(D*L^T)*x' = y$ (back-substitution); and
$x = (P^T)*x'$ (inverse permutation).

Now we will apply above steps to the block-partitioned representation. For the sake of brevity, in what follows we will refer to fill-reducing permutation and factorization step as factorization stage forward-elimination, back-substitution and inverse permutation steps as the "solution stage."

Factorization Stage $$A' = P*A*P^T \begin{bmatrix} P_1 & 0 \\ 0 & I \end{bmatrix} \begin{bmatrix} A_{11} & A_{12} \\ A_{21} & A_{22} \end{bmatrix} = \begin{bmatrix} P_1*A_{11}*P_1^T & P_1*A_{12} \\ A_{21}*P_1^T & A_{22} \end{bmatrix}$$

$$A' = L*D*L^T$$

$$\begin{bmatrix} P_1*A_{11}*P_1^T & P_1*A_{12} \\ A_{21}*P_1^T & A_{22} \end{bmatrix} = \begin{bmatrix} L_{11} & 0 \\ Z_1 & L_{22} \end{bmatrix} \begin{bmatrix} D_{11} & 0 \\ 0 & D_{22} \end{bmatrix} \begin{bmatrix} L_{11}^T & Z_1^T \\ 0 & L_{22}^T \end{bmatrix} =$$

$$\begin{bmatrix} L_{11}*D_{11}*L_{11}^T & L_{11}*D_{11}*Z_1^T \\ Z_1*D_{11}*L_{11}^T & L_{22}*D_{22}*L_{22}^T + Z_1*D_{11}*Z_1^T \end{bmatrix}$$

The factorization stage thus can be accomplished through the following steps:

(i) Compute $P_1*A_{11}*P_1^T = L_{11}*D_{11}*L_{11}^T$ ($LDL^T$ factorization of $A_{11}$). Note that since $A_{11}$ is the static part of the matrix, this step needs to be done only once.

(ii) Compute $L_{11}*D_{11}*Z_1^T = P_1*A_{12}$. Note that $Z_1^T$ is $N_1 \times N_2$ in size, this step just represents forward elimination on a collection of right-hand-sides. Also note that $P_1*A_{12}$ (row permutation of $A_{12}$) is sparse and as we will see later, it is important to exploit this sparsity for performance.

(iii) Compute $A_{22}' = A_{22} - Z_1*D_{11}*Z_1^T$. Note that this step requires $Z_1*D_{11}*Z_1^T$ (matrix-matrix multiplication).

(iv) Compute $A_{22}' = L_{22}*D_{22}*L_{22}^T$ ($LDL^T$ factorization of $A_{22}'$). Note that in this step, we do the factorization on a permuted $A_{22}'$ (i.e. $A_{22}'' = P_2*A_{22}'*P_2^T$). This can be done without affecting other steps in the algorithm.

Solution Stage

Let $$\begin{bmatrix} y_1 \\ y_2 \end{bmatrix} = \begin{bmatrix} D_{11}*L_1^T & D_{11}*Z_1^T \\ 0 & D_{22}*L_{22}^T \end{bmatrix} \begin{bmatrix} P_1*x_1 \\ x_2 \end{bmatrix}$$

The solution step proceeds as follows. First we perform $$\begin{bmatrix} L_{11} & 0 \\ Z_1 & L_{22} \end{bmatrix} \begin{bmatrix} y_1 \\ y_2 \end{bmatrix} = \begin{bmatrix} P_1*b_1 \\ b_2 \end{bmatrix}$$

followed by, $$\begin{bmatrix} D_{11}*L_{11}^T & D_{11}*Z_1^T \\ 0 & D_{22}*L_{22}^T \end{bmatrix} \begin{bmatrix} x_1' \\ x_2' \end{bmatrix} = \begin{bmatrix} y_1 \\ y_2 \end{bmatrix}$$

and finally, $$\begin{bmatrix} x_1 \\ x_2 \end{bmatrix} = \begin{bmatrix} P_1^T*x_1' \\ x_2' \end{bmatrix}.$$

It can thus be broken down into:

(i) solve $L_{11}*y_1 = P_1*b_1$—this is forward elimination (lower triangular solve);
(ii) solve $L_{22}*y_2 = b_2 - Z_1*y_1$—also, lower triangular solve;
(iii) solve $D_{22}*L_{22}^T*x_2' = y_2$—back-substitution stage;

(iv) $D_{11}*L_{11}^{T}*xx_1'=y_1-D_{11}*Z_1^{T}*x_2$—also back-substitution stage; and (v) $x_1=P_1^{T}*x_1'$; $x_2=x_2'$—inverse permutation step to get the final solution vector.

Implementation

In this section we will describe implementation details of the above-described technique and present efficient optimizations developed as part of an implementation.

One characteristic of the circuit simulation problem (a feature actually shared by numerous other application areas and problems also) is that the structure of the matrix only depends on the topology of the circuit being simulated. Since, in most cases the circuit topology remains fixed during the duration of the simulation (i.e. circuit elements are neither added nor removed), the underlying linear systems have same structure (i.e. the zero non-zero pattern remains fixed). Thus, in a time-dependent simulation, at every time-step only the values of matrix entries change.

To take advantage of this feature, the algorithm is implemented in four primary stages:

(i) Prefactorization Stage—This is a preprocessing step and is done only once in the beginning of the simulation. So as long as the matrix structure remains fixed, it is not repeated. In this step, symbolic processing is performed on the matrix system to minimize fill-in and the factorization operation count. During this stage, efficient data structures are derived for use during the numerical factorization stages and in keeping track of the static and dynamic portions of the matrix. Depending on the cache-characteristics of the underlying processor, the data-structures are cache-blocked to maximize data reuse.

(ii) Factorization Stage—This is the step where the actual numerical calculations associated with performing factorization (as described above) are performed.

(iii) Solution Stage—In this stage, the numerical calculations associated with solution stage (as described above) are performed.

(iv) Cleanup Stage—This is called at the end of the simulation or when linear solver is no longer needed to be kept active in the program. This step just frees all the internal data-structures used by the linear solver and resets it.

One embodiment of the present invention uses four simple Application Programming Interfaces (APIs) implementing each of these stages:

scf_blkprefactor( . . .
scf_blkfactor( . . .
scf_blksolve( . . .
scf_blkfreesys( . . .

In this embodiment, the user only needs to use these APIs (and pass the parameters needed by them) to invoke the various features in the linear solver.

Implementation Approaches

Note that the block-partitioned algorithm can use two different approaches. (1) In a "dense-dynamic" approach, the static portion ($A_{11}$ and all associated computation steps) is treated as sparse but the dynamic portion ($A_{12}$, $A_{21}$, $A_{22}$ and all associated computation steps) are treated as dense blocks (i.e., their sparsity it ignored). (2) In a "sparse-dynamic" approach, the entire matrix (both the static and dynamic parts) and all associated steps in the overall computation is treated as sparse. This approach is the superior of the two in both run-time performance and memory overhead, but is substantially more complex to implement.

In what follows, we will describe the sparse-dynamic method in more detail.

Sparse Dynamic Method

We start with some preliminary material to help in explaining the later sections. The sparse matrices (and blocks) arising in the algorithm are represented using the Harwell-Boeing (also called CSC) scheme (in which only the non-zeroes in the matrix are stored). In the C programming language, it can be implemented as

```
typedef struct {
    int nrows;      /*number of rows in the matrix*/
    int ncols;      /*number of cols in the matrix*/
    int *colptr;    /*pointer to start of each column*/
    int *rowind;    /*non-zero row indices*/
    double *anz;    /*non-zero matrix entry values*/
} ahb;              /*Harwell-Boeing form matrix storage*/
```

Figures 3, 4:
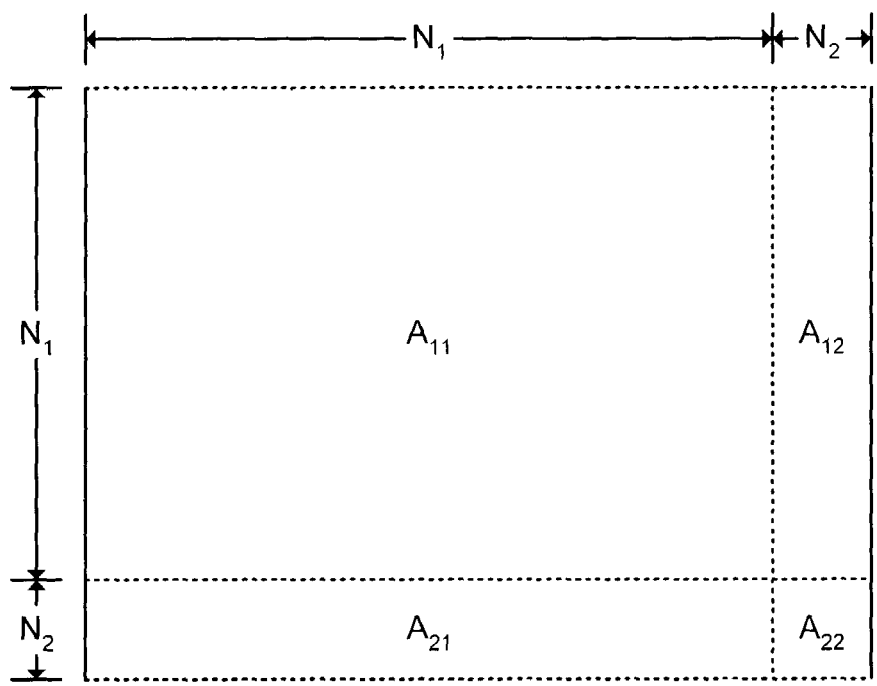
FIG. 3 illustrates the supernode structure of a sparse matrix in accordance with an embodiment of the present invention.
FIG. 4 illustrates a block-partitioned matrix in accordance with an embodiment of the present invention.

A supernode in the factor L of a sparse symmetric matrix ($L_{11}$ and $L_{22}$ in above) are sets of contiguous columns having the structure illustrated in FIG. 3. A supernode thus has a dense triangle at its apex and the zero/non-zero pattern below the triangle is identical for all the columns. Identification and exploitation of supernodal structures in sparse matrix systems are at the heart of computational efficiency since dense linear algebra techniques (cache-blocking, loop unrolling, loop tiling, software pipelining and others) can be applied on the dense blocks representing the supernodal entries. The identical patterns also substantially reduce the indirect addressing overhead needed in sparse elimination.

Supernodes can be represented with a single 1-d array of length N (# cols in matrix)

if supernode[i]>0→it is width of supernode starting at i;
if supernode[i]<0→i th col is in supernode starting at i+supernode[i]

For sparse rectangular matrices, we extend the concept of supernodes to entire columns with identical zero/non-zero patterns. These are called "supervariables." For an m×n rectangular matrix, the supervariables will be represented with a 1-d array of length n (# of cols in matrix)—in an identical fashion as supernodes if supervar[i]>0→it is width of supervariable starting at i;
if supervar[i]<0→i th col is in supervariable starting at i+supervar[i]

Sparse Dynamic Method

The section presents pseudo-code for the three primary implementation stages of the block partition algorithm, namely, prefactorization, factorization and solution, respectively, are presented for the sparse dynamic method. In later sections, we describe in detail the computational primitives that are the building blocks of the overall technique presented below.

Sparse Dynamic Prefactorization

The code for the function scf_blkprefactor( . . . ) can include the following operations:

1. check consistency of input arguments;
2. prefactor $A_{11}$ and extract $A_{11}$perm, $A_{11}$invp vectors (This involves matrix reordering, symbolic factorization and setting up internal data-structures for numerical factorization of $A_{11}$. The pre-factor routine for the sparse symmetric solver is used.);
3. determine structure of $A_{12}$ and allocate space for $A_{12}$ ($A_{12}=A_{21}^{T}$, so this step involves performing symbolic sparse matrix transpose);
4. determine structure of $P_1*A_{12}$ and allocate space for $P_1*A_{12}$ (a novel approach is used to find the structure of permutation of $A_{12}$ symbolically and an efficient data structure is setup to perform $P_1*A_{12}$ numerically with minimal indirect addressing and computation);

5. determine structure of $Z_1^T$; in $L_{11}*(D_{11}*Z_1^T)=P_1*A_{12}$ and allocate storage (this step involves using a novel algorithm to perform symbolic sparse forward elimination taking into account sparsity in both $L_{11}$ and $P_1*A_{12}$);

6. determine structure of $Z_1$ and allocate storage ($Z_1 = (Z_1^T)^T$, so this step involves performing symbolic sparse matrix transpose);

7. determine supervariables in $P_1*A_{12}$ and $Z_1^T$ (in this step an efficient algorithm for determining supervariables of $P_1*A_{12}$ is presented. We also show that supervariable structure of $P_1*A_{12}$ is always finer than supervariable structure of $Z_1^T$. Hence, one only needs to find supervariables in $P_1*A_{12}$.);

8. determine structure of $Z_1*D_{11}*Z_1^T$ and allocate storage (this step is essentially finding structure of product of two matrices producing a symmetric result matrix. A novel one-pass algorithm for determining the structure symbolically is presented.);

9. determine structure of $A_{22}'=A_{22}'-Z_1*D_{11}*Z_1^T$ and allocate storage (this involves an algorithm for symbolic addition/subtraction of two sparse matrices);

10. prefactor $A_{22}'$, allocate storage for sparse treatment of $A_{22}'$ and unset $A_{22}$dense switch (this step applies the same algorithms as applied in prefactoring step for $A_{11}$);

11. (i) Compute memory overhead and flop count for dense and sparse treatment of $A_{22}'$,
    (ii) Apply a heuristic to determine if $A_{22}'$ should be treated as dense or sparse,
    (iii) If $A_{22}'$ is to be treated as dense, then {
        allocate storage for dense treatment of $A_{22}'$;
        free storage associated with sparse $A_{22}'$ treatment; and
        set $A_{22}$dense switch;
    };

12. do some final cleanup.

Sparse Dynamic Factorization

The code for the function scf_blkfactor( . . . ) can include the following operations:

1. check consistency of input arguments;
2. check refact switch. If refact==Yes, perform numerical factorization of $A_{11}$ (this is performed using the supernodal right-looking Cholesky factorization solver discussed previously). If refact==No, do not refactor $A_{11}$, but use previously factored values. If no previous factorization, then signal error;
3. compute $A_{12}$ (transpose of $A_{21}$) (this involves numerical computation of $A_{21}$ sparse transpose using data-structures computed earlier in symbolic sparse transpose step);
4. compute the product $P_1*A_{12}$ (numeric computation of permutation of $A_{12}$ using data-structures computed earlier in symbolic sparse transpose step);
5. obtain $D_{11}*Z_{11}^T$ by solving $L_{11}*(D_{11}*Z_{11}^T)=P_1*A_{12}$ (this is based on a novel algorithm developed for performing numerical sparse forward elimination with multiple sparse right-hand side vectors);
6. obtain $Z_1$ (this involves numerical sparse transpose and scaling by diagonal vector, accounting for positive semi-definiteness in the factor of $A_{11}$);
7. obtain the product $Z_1*D_{11}*Z_{11}^T$ (this uses a novel efficient algorithm implemented to compute numerical phase of sparse matrix-matrix product, only lower triangle of product is computed);
8. perform numerical factorization of $A_{22}'$. If is $A_{22}$dense switch is set, then compute $A_{22}'=A_{22}-Z_1*D_{11}*Z_1^T$, and use LAPACK routine dsytrf to factorize $A_{22}'$. (LAPACK (Linear Algebra Package) is written in Fortran77 and provides routines for solving systems of simultaneous linear equations, least-squares solutions of linear systems of equations, Eigenvalue problems, and singular value problems. Additional information about LAPACK can be obtained on the Internet at http://www.netlib.org/lapack/index.html.) Else, compute $A_{22}'=A_{22}-Z_1*D_{11}*Z_1^T$ using numerical phase of sparse matrix-matrix addition primitive, and perform numerical factorization of $A_{22}'$ using sparse supernodal right-looking Cholesky solver.

Sparse Dynamic Solution

Note that one embodiment of the present invention has the ability to solve multiple right hand sides simultaneously, although in most cases there is usually only one right hand side (rhs).

The code for the function $scf_{13}$ blksolve( . . . ) can include the following operations:

1. check consistency of input arguments;
2.

```
loop over the number of rhs's
for (ir=0; ir < nrhs; ir++) {
    -permute b₁ with P₁ i.e compute P₁*b₁
    -solve L₁₁*y₁ = P₁*b₁ system to get y₁ (this involves sparse
    forward elimination with dense right hand size vector)
    -compute b₂' = b₂ - Z₁*y₁ (Z₁*y₁ is sparse matrix-dense vector
    product)
    -solve the system A₂₂'*x₂ = b₂'
    -if (is A₂₂dense switch is set) then {
        --use LAPACK dsytrs routine to solve for x₂'
    } else {
        -- use sparse triangular solver to obtain x₂'
    }
    -compute y₁' = y₁ - (D₁₁*L₁₁ᵀ)*x₂ ((D₁₁*L₁₁ᵀ)*x₂ is sparse matrix-
    dense vector product)
    -solve (D₁₁*L₁₁ᵀ) x₁' = y₁'(this is sparse back-substitution stage
    with dense right hand side vector)
    -compute the final permutation and get the final solution vector
    x₁ = P₁ᵀ*x₁'; x₂ = x₂'
} /*for (ir=0; ir<nrhs; ir++) loop*/
```

Computational Kernels of Sparse Dynamic Method

We now describe an implementation of the computational kernels mentioned in the previous section where an overview of the overall sparse dynamic algorithm was presented. Only primitives where we have enhanced a previously known algorithm or developed a new approach are described.

Note that all the steps described above can be implemented independently (unless otherwise indicated) although the techniques for some cases have been borrowed from elsewhere.

Technique for $P_1*A_{12}$ Determination (Symbolic and Numeric)

Given sparse $A_{12}$ and $P_1$ (permutation), determine $B=P_1*A_{12}$. Input $A_{12}$ is in Harwell-Boeing storage and output B is also in Harwell-Boeing storage.

```
Let nrows: #rows in A_12
    ncols: #cols in A_12
    nnz: #non-zeroes in A_12
    perm: permutation vector
    invp: inverse permutation vector (perm, invp have usual
        definition, See HNP)
Symbolic Step:
    begin get_symbolic_P_1A_12 {
        number of nonzeroes in B are same as nnz, use this to
        allocate storage for HB vectors representing B;
        set bcolptr[i] = a12colptr[i] for all i=0..ncols-1;
        for (j=0; j<ncols; j++) {
            for non-zero entries in each column of A_12 do {
                compute invp[a12rowindices] and
                accumulate in
                a temp vector (tmp)
            };
            sort entries of tmp in ascending order;
            copy tmp vector into browindices for column j;
        }
        /*find the location pointer array which maps the arowind indices
        to browind indices*/
        for (j=0; j<ncols; j++) {
            for non-zero entries in each column of A_12 do {
                new = invp[a12rowind[i]];
                search for new in browind vector for
                column j and
                assign its location in blocptr array;
            }
        }
    } end get_symbolic_P_1A_12
Numerical Step:
    Let nnz = #non-zeroes in B = P_1A_12
    begin get_numeric_P_1A_12 {
        for (i=0; i<nnz; i++);
        bval[blocptr[i]] = a12val[i]; /*recall B = P_1*A_12*/
    } end get_numeric_P_1A_12
```

Note that by computing blocptr in symbolic stage, the numeric stage of the permutation can be accomplished in nnz steps (sparse scatter). Also note that compiler optimizations, such as software pipelining and data-prefetching, becomes easier in this form.

Determine Supervariables in $P_1*A_{12}$

Given the zero/non-zero pattern of $P_1*A_{12}$ matrix, this technique finds sets of columns with identical patterns (supervariables).

```
Let nrows: #rows in A_12
    ncols: #cols in A_12
    supervar P_1A_12: int array of length ncols
    for (j=0; j<ncols; j++) {
        determine non-zero length of each column of
        P_1*A_12 and
        store in temp vector mcollen;
    }
    nsupers=1; size=1; current=0;
    for (j=1; j<ncols; j++) {
        if (mcollen[i] == mcollen[i-1] && pattern_of_i_&_
        (i-1)_match) {
            record col i as member of supervar which
                i-1 is part of;
            increment width of current supervar;
        } else {
            col i is the root column of a new supervar;
            set width of new supervar to 1;
            increment nsuper (# of supervars) counter;
        }
    }
    for (j=0; j<nsupers; j++) {
        split supervars into chunks that fit in the cache of
        the underlying cpu (determined in a separate step);
        /*the cache-splitting creates a finer partition*/
    }
```

Note that supervars with a width of 1 are called singletons. Also note that the above algorithm determines a "supervariable partition" of $P_1*A_{12}$. There are "many" partitions possible depending on the initial ordering of columns of $P_1*A_{12}$. There are factorial(ncols) orderings of $P_1*A_{12}$ columns possible.

Also note that the above algorithm determines a "supervariable partition" of $P_1*A_{12}$. This partition is not guaranteed to be maximal but it is guaranteed to be larger or at least as large as the minimal supervariable partition. The maximal partition is nsupers=1 (all columns have identical pattern), and the minimal partition is nsupers=ncols (all columns have dissimilar patterns).

Relation between Supervariables of $P_1*A_{12}$ and $Z_1^T$

Note that supervariables in $P_1*A_{12}$ form a finer partition than the supervariables in $Z_1^T$. Consider Lx=y, where L is sparse lower triangular and y is a sparse vector. Then, we know Struct(x) is superset of Struct(y) (i.e., if $y_i$ is symbolically non-zero then $x_i$ is also symbolically non-zero). However, the reverse is not true, so x has more symbolic non-zeros than y.

The following holds with regards to zero/non-zero patterns of $P_1*A_{12}$ and $Z_1^T$. Since $L_{11}*(D_{11}*Z_1^T)=P_1*A_{12}$, each corresponding column of $Z_1^T$ and $P_1*A_{12}$ satisfies Lx=y relation. Hence, for each column of $Z_1^T$ and $P_1*A_{12}$, Struct $(Z_1^T{}_i)$ is superset of Struct($[P_1*A_{12}]_i$) for all i=0 ... Ncols-1.

Given a certain ordering of columns of $P_1*A_{12}$, the following holds. (1) If 2 consecutive columns in $P_1*A_{12}$ have same pattern, the corresponding 2 consecutive columns in $Z_1^T$ must have same pattern (the corresponding columns in $Z_1^T$ cannot have dissimilar pattern). (2) If 2 consecutive columns in $P_1*A_{12}$ have different pattern, the corresponding 2 consecutive columns in $Z_1^T$ may have same pattern.

Thus, the number of supervars in $P_1*A_{12}$>the number of supervars in $Z_1^T$. Hence, the supervariable partition of $P_1*A_{12}$ is finer than supervariable partition of $Z_1^T$. This observation has important performance consequences. It is sufficient to determine supervariables of $P_1*A_{12}$. Given a supervariable partition of $P_1*A_{12}$, one can unroll over the columns of supervariables during the numerical stage of $L_{11}*(D_{11}*Z_1^T)=P_1*A_{12}$. This can significantly increase data-reuse and lead to higher cache hit-rate.

Determining Structure of $Z_1^T$ in $L_{11}*(D_{11}*Z_1^T)=P_1*A_{12}$

Given structure of $L_{11}$ and $P_1*A_{12}$, we want to find the structure of $Z_1^T$ satisfying the relation $L_{11}*(D_{11}*Z_1^T)=P_1A_{12}$. The problem can be reduced to finding structure of x such that Lx=b where b is a sparse vector (this because columns of $P_1*A_{12}$ can be thought of as multiple right hand side vectors).

We take advantage of supernodal structure of L in the following way. For a supernode in L of size n, rooted at column i, $S_i$: i ... i+n−1, the following is true. (a) If $x_i$ is symbolically non-zero, then $x_k$, k=i+1 ... (i+n−1) are symbolically non-zero. (b) Also, if $x_j$ is non-zero (i≤j<i+n−1), then $x_k$ (j≤k≤i+n−1) are also symbolically non-zero. The validity of (a) and (b) imply that the algorithm for determination of the structure of x can be made highly efficient given the supernodes of L.

We also take advantage of the supervariables in $P_1A_{12}$. Running the outermost loop only on the root column of each supervariable in $P_1A_{12}$ gives rise to additional improvements in the computational efficiency.

```
Let
    Nrows: # of rows in Z₁ᵀ, P₁*A₁₂ and L₁₁
    Ncols: # of cols in Z₁ᵀ and P₁*A₁₂
    Ns: # of supervariables in P₁*A₁₂
    mb: array of int:1 of length n (bit-vector)
    mx: array of int:1 of length n (bit-vector)
    mt: array of int:1 of length n (bit-vector)
    supernode: supernode vector of L₁₁
    supervar P₁A₁₂: supervariable vector of P₁A₁₂
    jst = 0;
    /*Loop over supervariables of P₁*A₁₂*/
    while (jst < Ncols) {
        jen = jst + supervar P₁A₁₂[jst]; /*last col+1 of
        supervariable rooted
            at column jst*/
        mb[i] = 0 for i=0...Nrows-1; /*determine structure
        of column jst
            of Z₁ᵀ*/
        mx[i] = 0 for i=0...Nrows-1;
        mt[i] = 0 for i=0...Nrows-1;
        for (i=0....collen_P1A12[jst]) mb[rowind_P1A12[i]] = 1;
        /*set
            mask of rhs*/
        /*loop over supernodes of L₁₁*/
        isup = icol = icnt = 0;
        while (isup < Nrows) {
            ien = isup + supernode[isup];
            if (supernode[isup] == 1) { /*singleton supernode*/
                mx[icol] = mb[icol]|mt[icol];
                /*if mx is non-zero, determine updates from it*/
                if(mx[icol] != 0) {
                    record icol in temp vector;
                    increment icnt;
                    for (i=0...collen_L₁₂[icol]) {
                        mx[rowind_L₁₁[i]] = 1;
                    }
                }
            }
            else {
                /*L₁₁ supernode of size > 1; we want to find first column
                in the supernode for which x is not-zero; all cols
                from that col. to last col. of supernode do not
                need to be checked*/
                while (icol < ie'n) {
                    mx[icol] = mb[icol]|mt[icol];
                    if(mx[icol] != 0) {
                        ifirst = icol;
                        break;
                    }
                    icol++;
                } /*while*/
                if ((icol < ien) && (mx[icol] != 0)) {
                    for (; icol < ien; icol++) {
                        mx[icol] = 1;
                        record icol in temp vector;
                        increment icnt;
                    }
                    /*compute updates from dense portion
                        of ifirst super*/
                    theFirst = supernode[isup] - (ifirst - isup);
                    for (j=theFirst.. lcollen_L₁₁[ifirst]) {
                        mt[rowind_L₁₁[j]] = 1;
                    }
                }
            } /*of if (supernode[isup]==1)*/
        /*At this point we have determined the structure of column jst of Z₁ᵀ
        (stored in a temp vector). The structure of all columns of supervariable
        from jst...jen-1 will be identical. We allocate storage for these columns
        and copy the indices into the appropriate locations in the permanent data
        structure holding Z₁ᵀ structure. This data structure is dynamically grown
        using realloc function.*/
            len = icnt*(jen-jst);
            realloc rowind_Z1T and grow it by len words;
            adjust column pointers: colptr_Z1T[jst+1....jen];
            copy rowindices in temp vector in locations;
            rowind_Z1T[colptr_Z1T[j]]....colptr_Z1T[j+1]-1]
                for j=jst..(jen-1);
            jst = jen; /*start processing next supervariable of P₁A₁₂*/
        } /*end of while (isup < Nrows) loop*/
    } /*end of while (jst < Ncols) loop*/
```

Note that $D_{11}$ is a diagonal matrix and has no effect on symbolic processing.

Numerical Computation of $Z_1^T$ in $L_{11}*(D_{11}*Z_1^T)=P_1*A_{12}$

Given structure of $L_{11}$, $P_1*A_{12}$, $Z_1^T$ and numerical values in $L_{11}$ and $P_1A_{12}$, we want to find $Z_1^T$ satisfying the relation $L_{11}*(D_{11}*Z_1^T)=P_1A_{12}$. Note that we actually compute $(Z_1^T)'=(D_{11}*Z_1^T)$, so division by $D_{11}$ is not explicitly done until computation of $Z_1$. This eliminates use of divide in the nested loops of forward elimination. Thus, in effect, we solve $L_{11}*(Z_1^T)'=P_1A_{12}$.

```
Let  Nrows: # of rows in Z₁ᵀ, P₁*A₁₂ and L₁₁
     Ncols: # of cols in Z₁ᵀ and P₁*A₁₂
     Ns: # of supervariables in P₁*A₁₂
     supernode: supernode vector of L₁₁
     supervar P₁A₁₂: supervariable vector of P₁A₁₂
     ist = 0;
     while (ist < Ncols) {
         ien = ist + supervar P₁A₁₂ [ist];
         if (supervar P₁A₁₂ [ist] == 1) {
             solve for column ist (using do_onerhscol function);
         }
         else {
             /*process the P₁A₁₂ supervariable*/
             ir = ist;
             for (; ir < ien-3; ir+=4) {
                 solve for (4) columns: ir...ir+3 at a time (using
                     do_fourrhscol function);
             }
             for (; ir < ien-1; ir+=2) {
                 solve for (2) columns ir...ir+1 at a time if 2 or 3 left-
                     over cols (using do_tworhscol function);
             }
             for (; ir < ien; ir++) {
                 solve for (1) column ir at a time if 1 left-over col
                     (using do_onerhscol function);
             }
         }
         ist = ien;
     } /*end of while (Ist < Ncols)*/
```

Note that the structure of do_onerhscol, do_tworhscol and do_onerhscol are very similar. We outline do_tworhscol as follows. Given ir and ir+1, this function computes solution vectors for these two column indices. So effectively, we are solving $L \{x_0, x_1\}=\{y_0, y_1\}$, where lengths of $x_0, x_1$ are same and lengths of $y_0, y_1$ are same.

```
Let t₀, t₁: double array of length Nrows
Let d₀, d₁: double array of length Nrows (temp vectors)
leny = length of y₀ & y₁;
lenx = length of x₀ & x₁;
t0[i] = t1[i] = 0 for all i=0...Ncols-1;
scatter y0 into t0; (sparse scatter)
scatter y1 into t1; (sparse scatter)
for (i=0....lenx) {
    ist = rowind_x[i] ;
    if (supernode[ist] == 1) {
        compute x0[i], x1[i];
        compute updates from x0[i], x1[i] to t0 and t1;
```

-continued

```
        i = i + 1;
    }
    else {
        if (supernode[ist] > 1) { /*supernode rooted @ ist*/
            compute length of update (upwidth);
            set starting and ending columns for computing
            update;
        }
        else if (supernode[ist] < 0) { /*partial supernode*/
            compute length of update (upwidth);
            set starting and ending columns for computing
            update;
        }
        process upper triangle of supernode;
        /*Now that x0[i]...xsol[i+upwidth-1] and
        x1[i]...xsol[i+upwidth-1] are known, compute update from
        these and dense portion of supernode from cols ist..ien.
        Updates are computed using dense matrix-vector like
        kernel using x0, x1 as the two vectors. Updates are
        accumulated in d0 and d1. Note that use of two vectors
        increases reuse of dense entries of supernode allows loop
        unrolling. Scatter updates accumulated in d0 and d1 into t0
        and t1 vectors using sparse scatter kernels.*/
        i = i + up width;
    } /*end of if (supernode[ist] = = 1)*/
} /*end of for(i=0...lenx) loop*/
```

Finding Structure of $A^T * A$ Product

Given structure of matrix A and its transpose $A^T$, we want to find the structure of the lower triangle of the product $A^T * A$. The enhancement reduces the algorithm from a 2-pass method to a 1-pass method.

```
Let  m: #cols in A,
     n: #rows in A, and
     B = T*A where T=A^T (for brevity)
     marker: array n of ints
     tmp: array n of ints
     for (j=0; j<n; j++) { /*run over columns of B*/
         nnz = 0;
         for (i=0....collen_A[j]) { /*run over non-zeroes of
         column j of A*/
             k = rowind_A[i];
             for (ti= 0....collen_T[k]) { /*column k of T*/
                 trow = rowind_T[ti];
                 if ( (trow >= j) /*lower triangle of B*/
                      && (marker[trow] != j]) /*to avoid duplication of
                      marked nonzeroes*/{
                     marker[trow] = j;
                     tmp[nnz++] = trow;
                 }
             }
         }
         set-up column pointer for column j of B;
         increase storage of rowind_B by nnz words;
         copy nnz from tmp into rowind_B[colptr_B[j]...
         colptr_B[j+1]-1];
     } /*end of for (j=0; j<n; j++) */
```

Numerical Calculation of $B=A^T * A'$

Given structure of matrix A, $A^T$, B and their numerical values, we want to compute the product $B=A^T * A$. One point of novelty in this implementation is the use of supervariables of A to obtain: (1) a decrease in indirect addressing and decrease in load of non-zero index vector rowind_T; (2) an increase in data-reuse of $A^T$ entries and higher cache-hit rate; (3) unrolling of intermediate loops in the sparse loop nest; and (4) a decrease load of rowind_B The basic approach is as follows. Partition A as: $A=(A_{*1}, \ldots, A_{*n})$. Then $B=T*A=(T*A_{*1}, \ldots, T*A_{*n})$, where $T*A_{*j}=(T_{*1}, \ldots, T_{*m})*A_{*j}$. So, clearly if structure of $A_{*1}$ and $A_{*2}$ are same, the structure of $B_{*1}$ and $B_{*2}$ are same also. Thus, if supervariables of A are known, we can express the above as $B=T*A=(T*A_{*S1}, \ldots, T*A_{*Sn})$, where $A_{*S1}$ is supervariable $S_1$ of A and $A_{*SN}$ is supervariable $S_N$. Thus, if $A_{*S1}=(A_{*1}, A_{*2}, \ldots, A_{*s})$ (i.e. has s columns in it), $T*A_{*S1}=(T*A_{*1}, T*A_{*2}, \ldots, T*A_{*s})$, and so on. An additional implementation detail is that since we are computing only lower triangle of B, lesser and lesser portions of columns of T are used as one computes columns to right in B.

```
Let t0, t1, t2 and t3 be double temp vector of length n;
jst = 0;
while (jst < n) {
    jen = jst + supervarA[jst];
    if (supervarA[jst] = = 1) { /*singleton*/
        compute B__*jst = T*A__*j (column jst of B);
        /*Note that only entries below diagonal are computed. The
        product accumulated in the temp vector and sparse gather
        operation are performed subsequently.*/
    }
    else { /* compute over supervar rooted at jst*/
        j = jst;
        process four columns j, j+1, j+2, j+3 at a time, i.e. compute
        B__*j, B__*(j+1), B__*(j+2), B__*(j+3);
        -accumulate product in t0, t1, t2, t3
        -compute offsets for gathering into cols j...j+3 of B
        -perform sparse gather operation to put t0,t1,t2,t3 into
        columns j..j+3 of B
        process two columns j, j+1 at a time repeat above sub-steps;
        process one column j at a time repeat above sub-steps;
    }
    jst = jen;
}
```

Heuristic to Decide between Dense or Sparse Treatment of $A_{22}'$

Given structure of $A_{22}$'s, decide whether $A_{22}'*x_2'=b_2'$ should be solved assuming $A_{22}$'s to be dense or using a sparse approach that takes advantage of its sparsity. The main reason to give consideration to $A_{22}'$ being treated as dense is that in many problems, as the factorization proceeds more and more fill-in occurs towards the right of the matrix. As a result, often the apex supernode (or the lower right triangle in the matrix) fills-up naturally. In those cases, treating $A_{22}$'s as dense can be efficient and has the advantage of allowing calls to LAPCK dsytrf routine to be made. This routine in turn calls a routine, which is highly optimized. Thus, for these cases, the sparse kernels turn out to be substantially inferior to the dense case.

On the other hand, in general, we want $A_{22}'$ to be treated as sparse to preserve memory and to avoid performing any redundant operations. For systems where $A_{22}$'s is sparse, treating it as dense leads to a high runtime and memory overhead.

The heuristic involves: (1) determining the structure of $A_{22}'=A_{22}-Z_1*D_{11}*Z_1^T$; (2) performing reordering and symbolic factorization of $A_{22}'$; (3) counting the number of non-zeroes in sparse factor of $A_{22}$'s (as determined in symbolic factorization stage) mem_sparse; (4) estimating sparse flop count (flop_sparse); (5) computing rat_flop=flop_sparse/flop_dense; and (6) computing rat_mem=mem_sparse/mem_dense.

In particular,

```
if (rat_mem < MEMCUT && rat_flop < FLOPCUT)
    isA22dense = 0; /*treat A_22' as sparse*/
else
    isA22dense = 1; /*treat A_22' as dense */
``` currently, we have set
MEMCUT=0.4;
FLOPCUT=0.7;

Time-Based Simulation

Figure 5:
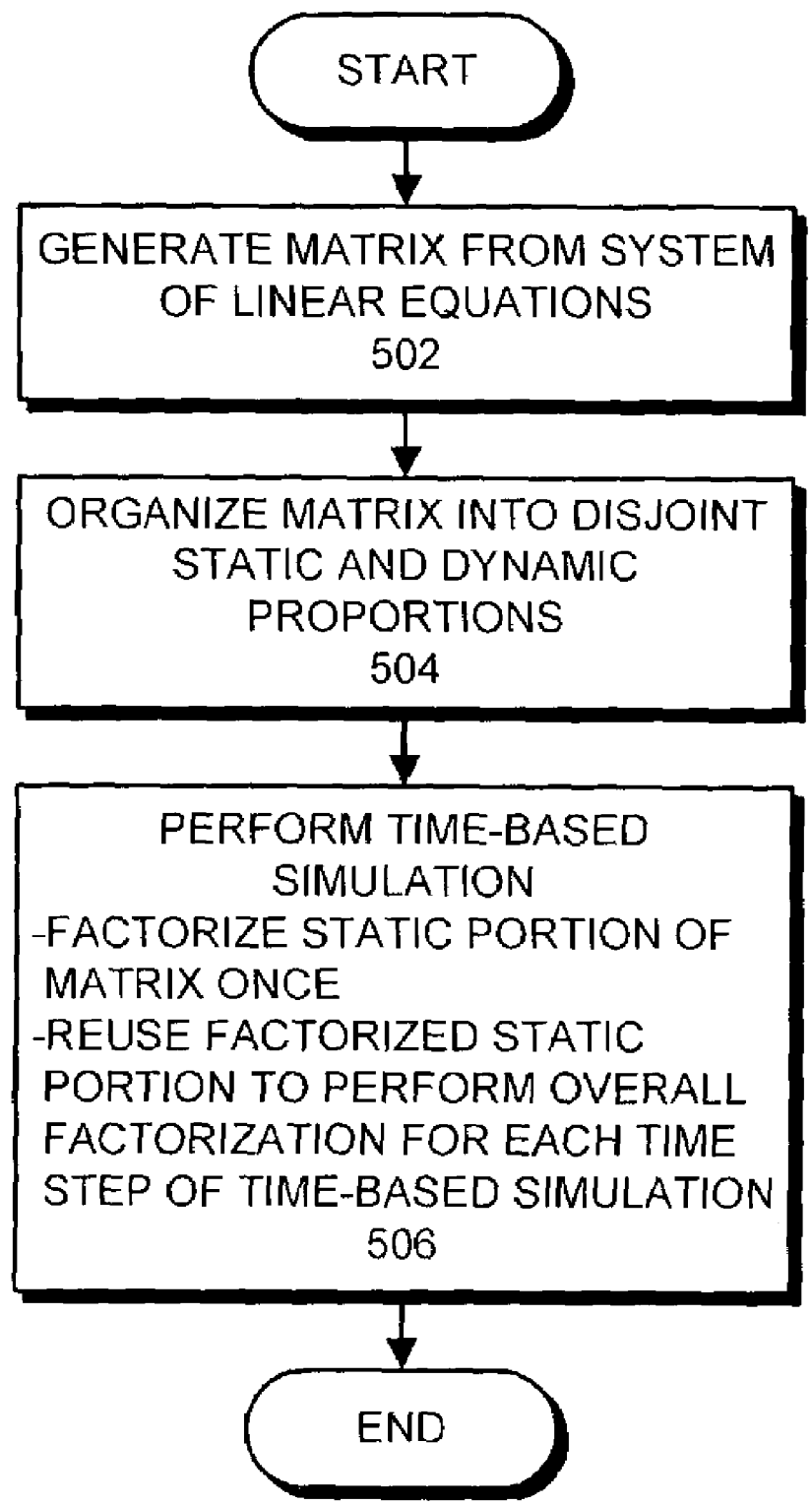
FIG. 5 presents a flow chart illustrating how a time-based simulation is performed in accordance with an embodiment of the present invention.

FIG. 5 presents a flow chart illustrating how a time-based simulation is performed in accordance with an embodiment of the present invention. The system starts by generating a matrix A from a system of linear equations (step 502). In doing so, the system organizes the matrix into disjoint static and dynamic portions, wherein the static portion contains entries that remain fixed over multiple time steps in the time-based simulation, and the dynamic portion contains entries that change between time steps in the time-based simulation (step 504).

The system then performs the simulation, which involves solving the system of linear equations for each time step in the simulation. In doing so, the system factorizes the static portion of the matrix A once and the reusing the factorized static portion to perform an overall factorization of the matrix A for each time step of the simulation as is described in preceding sections of this disclosure (step 506).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using a block-partitioned technique to efficiently solve a system of linear equations, comprising:
   receiving a matrix that specifies the system of linear equations to be used in performing a time-based simulation;
   wherein the matrix includes a static portion containing entries that remain fixed over multiple time steps in the time-based simulation;
   wherein the matrix includes a dynamic portion containing entries that change between time steps in the time-based simulation; and
   performing the time-based stimulation, wherein performing the time-based simulation involves solving the system of linear equations for each time step in the time-based simulation;
   wherein solving the system of linear equations involves factorizing the static portion of the matrix only once, and reusing the factorization of the static portion in performing an overall factorization of the matrix for each time step of the time-based simulation.

2. The method of claim 1, wherein prior to receiving the matrix, the method further comprises:
   generating the matrix from the system of linear equations; and
   organizing the matrix into disjoint static and dynamic portions.

3. The method of claim 2,
   wherein the static portion is located within an upper-diagonal block of the matrix; and
   wherein the dynamic portion includes a lower-diagonal block of the matrix and off-diagonal blocks located between the upper-diagonal block and the lower-diagonal block.

4. The method of claim 3,
   wherein the time-based simulation involves a simulation of a circuit;
   wherein the circuit includes linear elements that do not change between time steps in the time-based simulation;
   wherein the circuit includes non-linear elements that change between time steps in the time-based simulation;
   wherein the upper-diagonal block of the matrix represents connections between static elements of the circuit;
   wherein the lower-diagonal block of the matrix represents connections between dynamic elements of the circuit; and
   wherein the off-diagonal blocks of the matrix represent connections between dynamic and static elements of the circuit.

5. The method of claim 1, wherein the system of linear equations is a sparse system of linear equations and wherein the matrix is a sparse matrix.

6. The method of claim 5, wherein solving the system of linear equations involves using sparse matrix techniques on the static portion of the matrix and using dense matrix techniques on the dynamic portion of the matrix.

7. The method of claim 5, wherein solving the system of linear equations involves using sparse matrix techniques on both the static and dynamic portions of the matrix.

8. The method of claim 5, wherein the sparse matrix and other data structures used in solving the sparse system of linear equations are represented in Harwell-Boeing format.

9. The method of claim 1, wherein solving the system of linear equations involves using a technique based on Cholesky factorization to solve the system of linear equations.

10. A computer-readable storage medium storing instructions that when executed by a computer cause the computer to perform a method for using a block-partitioned technique to efficiently solve a system of linear equations, the method comprising:
    receiving a matrix that specifies the system of linear equations to be used in performing a time-based simulation;
    wherein the matrix includes a static portion containing entries that remain fixed over multiple time steps in the time-based simulation;
    wherein the matrix includes a dynamic portion containing entries that change between time steps in the time-based simulation; and
    performing the time-based simulation, wherein performing the time-based simulation involves solving the system of linear equations for each time step in the time-based simulation;
    wherein solving the system of linear equations involves factorizing the static portion of the matrix only once, and reusing the factorization of the static portion in performing an overall factorization of the matrix for each time step of the time-based simulation.

11. The computer-readable storage medium of claim 10, wherein prior to receiving the matrix, the method further comprises:

generating the matrix from the system of linear equations; and organizing the matrix into disjoint static and dynamic portions.

12. The computer-readable storage medium of claim 11,
wherein the static portion is located within an upper-diagonal block of the matrix; and wherein the dynamic portion includes a lower-diagonal block of the matrix and off-diagonal blocks located between the upper-diagonal block and the lower-diagonal block.

13. The computer-readable storage medium of claim 12,
wherein the time-based simulation involves a simulation of a circuit;

wherein the circuit includes linear elements that do not change between time steps in the time-based simulation;

wherein the circuit includes non-linear elements that change between time steps in the time-based simulation;

wherein the upper-diagonal block of the matrix represents connections between static elements of the circuit;

wherein the lower-diagonal block of the matrix represents connections between dynamic elements of the circuit; and wherein the off-diagonal blocks of the matrix represent connections between dynamic and static elements of the circuit.

14. The computer-readable storage medium of claim 10, wherein the system of linear equations is a sparse system of linear equations and wherein the matrix is a sparse matrix.

15. The computer-readable storage medium of claim 14, wherein solving the system of linear equations involves using sparse matrix techniques on the static portion of the matrix and using dense matrix techniques on the dynamic portion of the matrix.

16. The computer-readable storage medium of claim 14, wherein solving the system of linear equations involves using sparse matrix techniques on both the static and dynamic portions of the matrix.

17. The computer-readable storage medium of claim 14, wherein the sparse matrix and other data structures used in solving the sparse system of linear equations are represented in Harwell-Boeing format.

18. The computer-readable storage medium of claim 10, wherein solving the system of linear equations involves using a technique based on Cholesky factorization to solve the system of linear equations.

19. An apparatus for using a block-partitioned technique to efficiently solve a system of linear equations, comprising:

a receiving mechanism configured to receive a matrix that specifies the system of linear equations to be used in performing a time-based simulation;

wherein the matrix includes a static portion containing entries that remain fixed over multiple time steps in the time-based simulation;

wherein the matrix includes a dynamic portion containing entries that change between time steps in the time-based simulation; and a simulation mechanism configured to perform the time-based simulation;

a solving mechanism that is part of the simulation mechanism and is configured to solve the system of linear equations for each time step in the time-based simulation;

wherein the solving mechanism is configured to factorize the static portion of the matrix only once, and to reuse the factorization of the static portion in performing an overall factorization of the matrix for each time step of the time-based simulation.

20. The apparatus of claim 19, further comprising a matrix generating mechanism configured to generate the matrix from the system of linear equations, and in doing so to organize the matrix into disjoint static and dynamic portions.

21. The apparatus of claim 20,
wherein the static portion is located within an upper-diagonal block of the matrix; and wherein the dynamic portion includes a lower-diagonal block of the matrix and off-diagonal blocks located between the upper-diagonal block and the lower-diagonal block.

22. The apparatus of claim 21,
wherein the simulation mechanism is configured to perform a time-based simulation of a circuit;

wherein the circuit includes linear elements that do not change between time steps in the time-based simulation;

wherein the circuit includes non-linear elements that change between time steps in the time-based simulation;

wherein the upper-diagonal block of the matrix represents connections between static elements of the circuit;

wherein the lower-diagonal block of the matrix represents connections between dynamic elements of the circuit; and wherein the off-diagonal blocks of the matrix represent connections between dynamic and static elements of the circuit.

23. The apparatus of claim 19, wherein the system of linear equations is a sparse system of linear equations and wherein the matrix is a sparse matrix.

24. The apparatus of claim 23, wherein the solving mechanism is configured to use sparse matrix techniques on the static portion of the matrix and to use dense matrix techniques on the dynamic portion of the matrix.

25. The apparatus of claim 23, wherein the solving mechanism is configured to use sparse matrix techniques on both the static and dynamic portions of the matrix.

26. The apparatus of claim 23, wherein the solving mechanism is configured to represent the sparse matrix and other data structures used to solve the sparse system of linear equations in Harwell-Boeing format.

27. The apparatus of claim 19, wherein the solving mechanism is configured to use a technique based on Cholesky factorization to solve the system of linear equations.

* * * * *